(12) United States Patent
Vyas et al.

(10) Patent No.: US 12,244,958 B2
(45) Date of Patent: Mar. 4, 2025

(54) PERSPECTIVE DE-SKEWING OF ELECTRONIC IMAGES

(71) Applicant: SAMSUNG ELECTRONICS CO., LTD., Gyeonggi-Do (KR)

(72) Inventors: Kushal Kardam Vyas, Santa Clara, CA (US); Kenil S. Shah, Seattle, WA (US); Sajid Sadi, San Jose, CA (US); Sergio Perdices-Gonzalez, Sunnyvale, CA (US); Kathleen Sofia Hajash, Sunnyvale, CA (US)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 320 days.

(21) Appl. No.: 17/666,027

(22) Filed: Feb. 7, 2022

(65) Prior Publication Data

US 2023/0254437 A1 Aug. 10, 2023

(51) Int. Cl.
H04N 5/262 (2006.01)
G06T 3/608 (2024.01)
G06T 7/80 (2017.01)
H04N 5/77 (2006.01)
H04N 17/00 (2006.01)

(52) U.S. Cl.
CPC ........... *H04N 5/2628* (2013.01); *G06T 3/608* (2013.01); *G06T 7/80* (2017.01); *H04N 5/77* (2013.01); *H04N 17/002* (2013.01); *G06T 2200/04* (2013.01); *G06T 2207/10021* (2013.01);
(Continued)

(58) Field of Classification Search
CPC ...... H04N 5/2628; H04N 5/77; H04N 17/002; G06T 3/00; G06T 3/608; G06T 7/80; G06T 2200/04; G06T 2207/10021; G06T 2207/10028; G06T 2207/20084; G06T 2207/30201; G06T 2207/30208; G06T 2207/30244
See application file for complete search history.

(56) References Cited

U.S. PATENT DOCUMENTS 7,907,774 B2  3/2011 Parr et al.
8,970,569 B2  3/2015 Vilcovsky et al.
(Continued)

FOREIGN PATENT DOCUMENTS

CN   112000771 A   11/2020

OTHER PUBLICATIONS

Clover, J., "Testing the New FaceTime Attention Correction Feature in iOS 13," Jul. 3, 2019, retrieved from the Internet: <https://www.macrumors.com/2019/07/03/ios-13-attention-correction-facetime/>, 7 pg.
(Continued)

*Primary Examiner* — Katrina R Fujita
(74) *Attorney, Agent, or Firm* — CUENOT, FORSYTHE & KIM, LLC

(57) ABSTRACT

Image de-skewing can include acquiring pixel coordinates of an image captured by a camera adjoining an electronic display device. The pixel coordinates can be mapped to de-skewing coordinates using a predetermined de-skewing transformer that maps the pixel coordinates to de-skewing coordinates. A de-skewed image can be generated based on the de-skewing coordinates such that the de-skewed image is perpendicular to a principal axis extending from a predetermined location of an apparent camera on the electronic display device.

18 Claims, 12 Drawing Sheets

(52) U.S. Cl.
CPC ............. *G06T 2207/20084* (2013.01); *G06T 2207/30244* (2013.01)

(56) References Cited

U.S. PATENT DOCUMENTS

| | | | |
|---|---|---|---|
| 9,317,895 B1* | 4/2016 | Tidwell | G06T 3/08 |
| 9,691,125 B2* | 6/2017 | Suggs | G06F 1/3265 |
| 10,878,612 B2 | 12/2020 | Wang et al. | |
| 11,190,689 B1* | 11/2021 | Wang | H04N 23/683 |
| 2006/0017804 A1 | 1/2006 | Lee et al. | |
| 2011/0300929 A1* | 12/2011 | Tardif | A63F 13/424 |
| | | | 382/284 |
| 2013/0293669 A1* | 11/2013 | Lucey | G06V 40/16 |
| | | | 348/14.16 |
| 2015/0195443 A1 | 7/2015 | Dal Mutto et al. | |
| 2015/0220773 A1 | 8/2015 | Lucey | |
| 2016/0219258 A1 | 7/2016 | Woodgate et al. | |
| 2018/0068178 A1 | 3/2018 | Theobalt et al. | |
| 2021/0104063 A1 | 4/2021 | Kassis et al. | |
| 2021/0113079 A1 | 4/2021 | Tomasi et al. | |
| 2022/0217301 A1* | 7/2022 | Ballard | H04N 7/144 |
| 2022/0309672 A1* | 9/2022 | Cherian | G06T 7/75 |
| 2022/0335579 A1* | 10/2022 | Zhou | G06T 5/80 |

OTHER PUBLICATIONS

Gartenberg, C., "Microsoft's AI-powered 'Eye Contact' feature is finally coming to the Surface Pro X," [online] The Verge, Vox Media, LLC © 2021, Jul. 22, 2020, retrieved from the Internet: <https://www.theverge.com/2020/7/22/21334622/microsoft-eye-contact-surface-pro-x-video-chat-ai-correction-feature-rolling-out>, 3 pg.

Flynn, J. et al.,"Deepview: View synthesis with learned gradient descent," In Proceedings of the IEEE/CVF Conference on Computer Vision and Pattern Recognition, 2019, (pp. 2367-2376).

Zhou, T. et al., "Stereo magnification: Learning view synthesis using multiplane images," arXiv preprint arXiv:1805.09817, May 24, 2018, 12 pg.

Tucker, R. et al., "Single-view view synthesis with multiplane images," In Proceedings of the IEEE/CVF Conference on Computer Vision and Pattern Recognition, 2020 (pp. 551-560).

WIPO Appln. No. PCT/KR2023/001419, International Search Report, May 11, 2023, 4 pg.

WIPO Appln. No. PCT/KR2023/001419, Written Opinion, May 17, 2023, 4 pg.

* cited by examiner

PERSPECTIVE DE-SKEWING OF ELECTRONIC IMAGES

TECHNICAL FIELD

This disclosure relates to image processing, and more particularly, to automatically aligning camera-captured images to enhance a user's real-time viewing experience.

BACKGROUND

Social interaction increasingly takes place via the Internet and other communication networks using systems that enable users to engage with one another visually as well as audibly. Through the transmission of full-motion video images in real time, video conferencing and similar systems allow individuals to meet face-to-face even though remotely located from one another. Such systems include on-premises and cloud-based video conferencing platforms. Video conferencing is increasingly an embedded feature of applications related to business, telehealth, customer service, distance learning, and many other types of applications.

SUMMARY

In an example implementation, a method of image de-skewing can include acquiring pixel coordinates of an image captured by a camera adjoining an electronic display device. The method can include mapping the pixel coordinates to de-skewing coordinates using a predetermined de-skewing transformer that maps the pixel coordinates to de-skewing coordinates. The method can include generating a de-skewed image based on the de-skewing coordinates such that the de-skewed image is perpendicular to a principal axis extending from a predetermined location of an apparent camera on the electronic display device.

In another example implementation, a system for de-skewing images can include one or more processors configured to initiate operations. The operations can include acquiring pixel coordinates of an image captured by a camera adjoining an electronic display device. The operations can include mapping the pixel coordinates to de-skewing coordinates using a predetermined de-skewing transformer. The operations can include generating a de-skewed image based on the de-skewing coordinates such that the de-skewed image is perpendicular to a principal axis extending from a predetermined location of an apparent camera on the electronic display device.

In another example implementation, a computer program product includes one or more computer readable storage media, and program instructions collectively stored on the one or more computer readable storage media. The program instructions are executable by computer hardware to initiate operations. The operations can include acquiring pixel coordinates of an image captured by a camera adjoining an electronic display device. The operations can include mapping the pixel coordinates to de-skewing coordinates using a predetermined de-skewing transformer that maps the pixel coordinates to de-skewing coordinates. The operations can include generating a de-skewed image based on the de-skewing coordinates such that the de-skewed image is perpendicular to a principal axis extending from a predetermined location of an apparent camera on the electronic display device.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to image processing, and more particularly, to automatically aligning camera-captured images to enhance a user's real-time viewing experience. Video conferencing, as noted above, enables individuals to meet face-to-face despite being remotely located from one another. This can be advantageous to businesses as it can enhance remote interactions among colleagues, partners and customers while holding down travel costs. For example, employees can receive training without having to travel to a training site. Sales personnel, for example, do not need to travel to engage in face-to-face meetings with customers. Time is saved by employees avoiding travel to meet colleagues or customers, yet without sacrificing the benefit of nonverbal communications and the development of a stronger sense of community by engaging face to face with one another. On a personal level, the face-to-face connection enables individuals to develop a stronger sense of familiarity with other individuals whom they may never actually meet in person.

Notwithstanding these benefits, the user experience is often significantly diminished by the skewing of images that are generated by camera-endowed devices such as personal computers, laptops, and the like, which are used to facilitate video conferencing. The skewing results from the off-axis placement of a device's camera, which is typically placed on the border of the display of the device. For example, a user may be centered (or nearly so) in front of a display, but an image of the user rendered by a display-mounted camera is skewed by the camera's off-axis placement. The user may look straight into the display, but to other video conference participants the user appears skewed. Given the images generated by off-camera placement, one video conferencing participant may be looking up the nostrils of another participant, directly down on the top of another's head, or sideways at a partial profile of another. The effect can be extremely distracting.

Figure 1A:
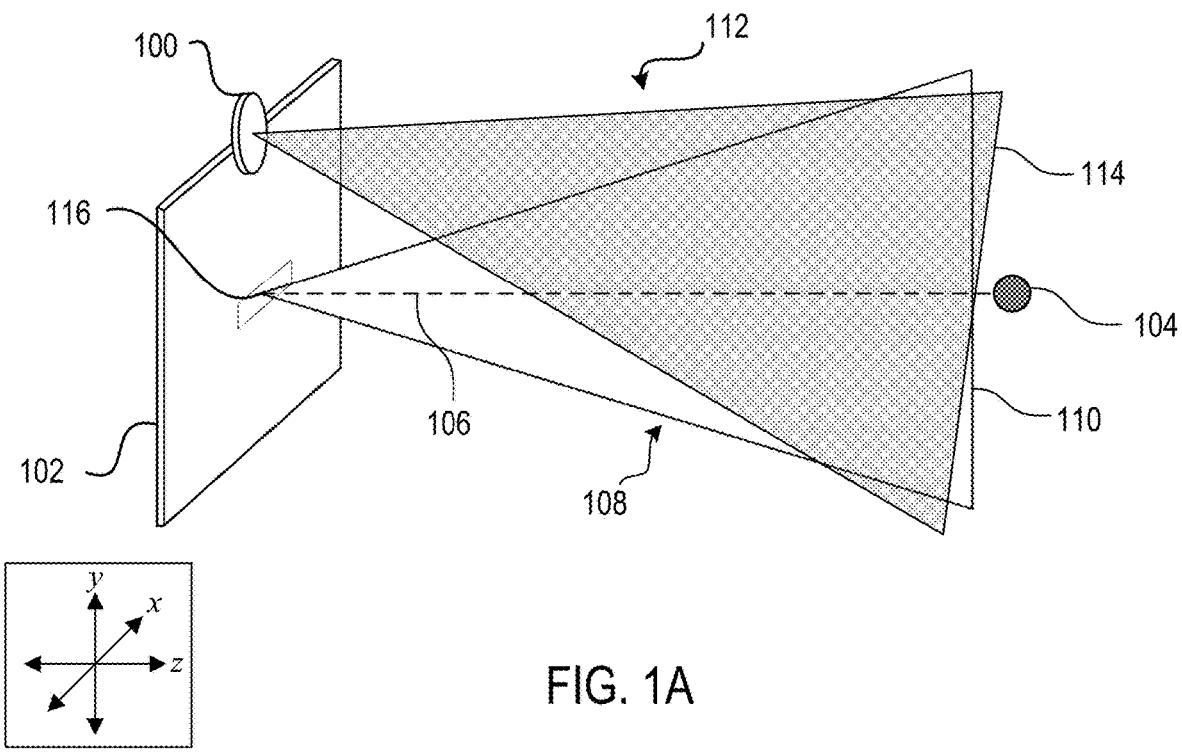
FIGS. 1A-1C illustrate the geometry of image skewing resulting from off-axis camera placements.
Figure 1B:
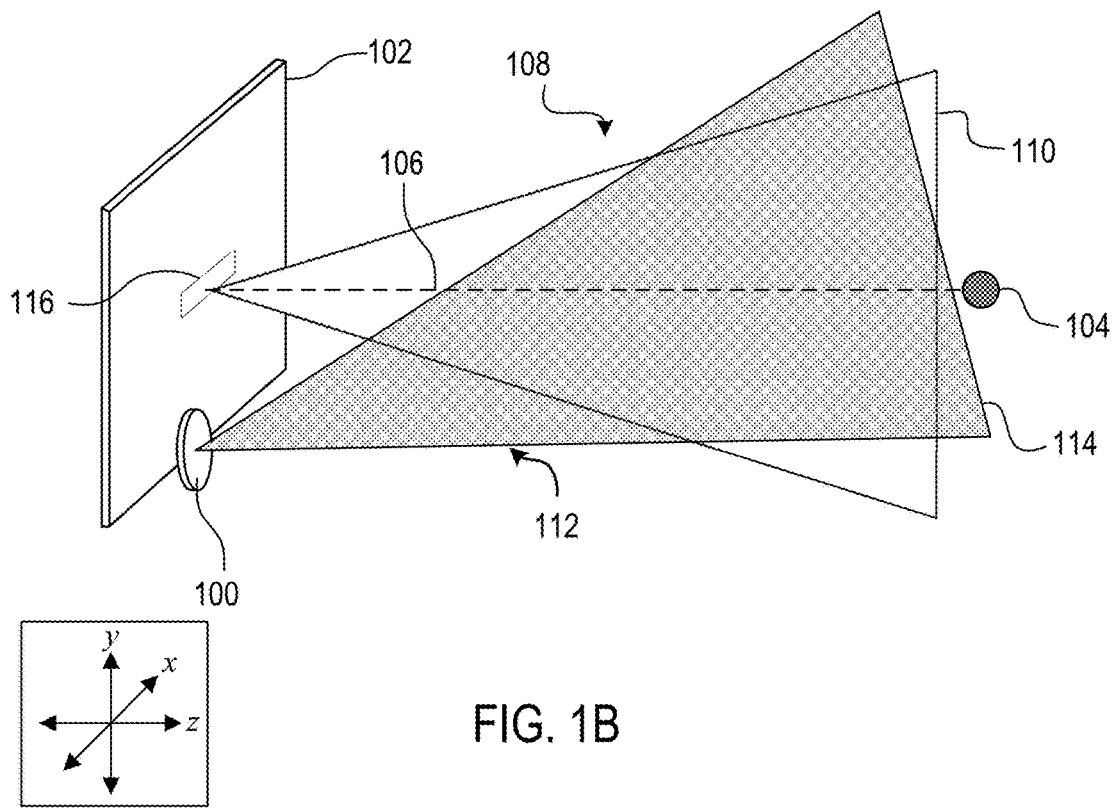
Figure 1C:
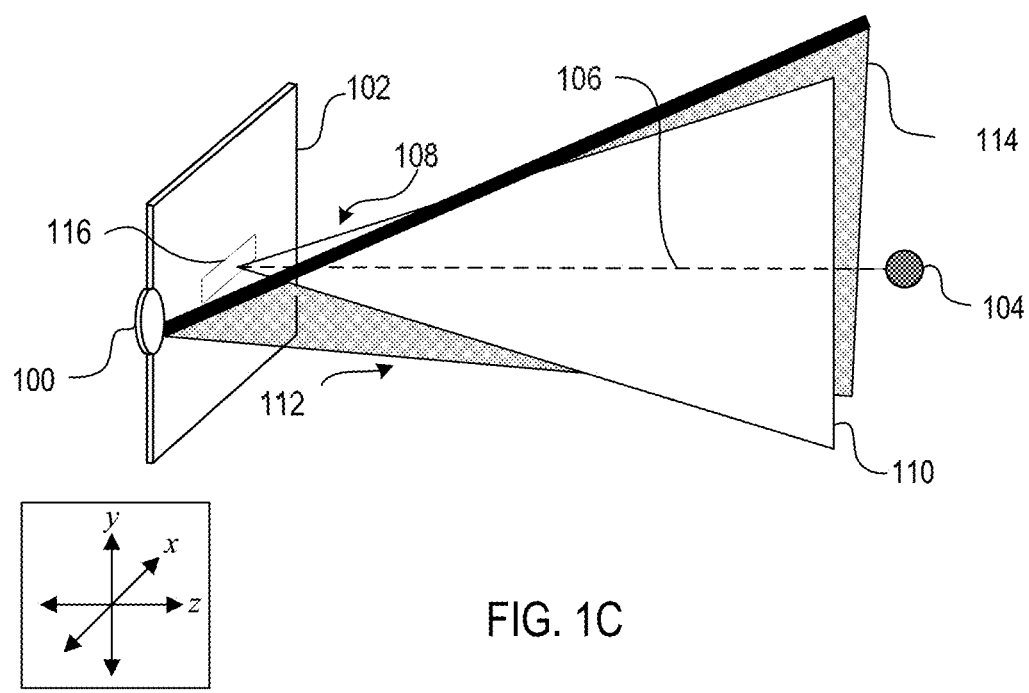

FIGS. 1A-1C illustrate the skewing effect of off-axis camera placements. The skewing effect can be demonstrated geometrically by treating the display as a plane (e.g., x-y plane) in a three-dimensional (3D) space. A principal axis (e.g., z-axis) extends outward from the planar display and is perpendicular, or normal, to the display (e.g., x-y plane in 3D space). As defined herein, "principal axis" is an axis that is perpendicular to the display plane and that extends outward from a position corresponding to the position of a virtual (or apparent) camera.

In FIG. 1A, camera 100 is adjacent display 102, along the top edge. Illustratively, position 104 lies on principal axis 106. Field-of-view (FOV) 108 extends from location 116 on display 102. Viewing plane 110 is perpendicular to principal axis 106. Location 116 is equidistance from the horizontal edges of display 102 and equidistance from the side edges of display 102. Viewing plane 110 corresponds to a viewing plane that would be generated were it captured by a camera positioned at location 116. By contrast, FOV 112 of camera 100 and corresponding viewing plane 114 are not perpendicular to principal axis 106 but are skewed relative to principal axis 106. The orientation of an image captured by camera 100 thus does not appear as though captured by a camera positioned at location 116. Likewise, in FIGS. 1B and 1C in which camera 100 is adjacent display 102 along the bottom edge and along the edge, respectively, FOV 112 is skewed, and images captured by camera 100 corresponding to viewing plane 114 are not perpendicular to principal axis 106 but instead are skewed. The user may be centered (or nearly so) relative to display 102, but the user's camera-captured image is skewed by the camera's off-axis placement.

The image skew is especially pronounced for a large-sized display. As defined herein, a "large-sized display" is a display in which the distance between a user and a display-mounted camera is substantially greater than the diagonal of the display for a viewing plane of the image captured by the camera to be invariant (or nearly so) to an in-plane camera rotation. If, for example, the display diagonal is 55 inches, then the distance between the user and the display-mounted camera must be at least 8 feet. Although large-sized displays are increasingly used for video conferencing, their use can exacerbate the user distractions engendered by image skewing.

In accordance with the inventive arrangements disclosed herein, example methods, systems, and computer program products are provided that are capable of mitigating or eliminating entirely image skewing due to off-axis camera placement. An aspect of the inventive arrangements is that a sequence of images (e.g., images of a video stream) generated by an off-axis camera appear as though the images were captured by a camera placed at the center of an electronic display (e.g., computer monitor, television screen). This enables, for example, each participant in a video conference to view a display screen while the participant appears to the other participants as though looking directly at them, even though the camera is in fact positioned off center from the display.

Although described herein primarily in the context of de-skewing images during video conferencing, it will be apparent that the inventive arrangements disclosed provide additional advantages in various other contexts as well. Although the inventive arrangements may be used with large-sized displays, nothing precludes their use with displays that are smaller than large-sized. Accordingly, other embodiments may include using one or more of the inventive arrangements with such smaller displays.

One aspect of the inventive arrangements, for example, is the generation of de-skewed images other than a facial image. Certain existing facial image replacement techniques use morphable 3D models to generate facial images, but these techniques do not extend to images of a full, non-facial scene. The inventive arrangements disclosed herein are generalizable to full-scene images of any type. Additionally, whereas the other techniques rely, for example, on gradient domain blending to generate facial images, the processes disclosed herein are highly parallel and can be performed in real time on low-compute devices.

An aspect of the inventive arrangements disclosed herein is image de-skewing performed using a pre-determined de-skewing transformer. The de-skewing transformer applies across all pixels of an image, and because it is predetermined, it can de-skew images in real time without the necessity of reconfiguration. Thus, the de-skewing transformer is faster and more computationally efficient than techniques requiring in-process adjustments. The de-skewing transformer is invariant to image depth and other optical parameters and is thus faster and more computationally efficient than techniques that are not invariant to these parameters. In contrast to other techniques that are dependent upon the degree of illumination of the image, for example, the de-skewing transformer performs independently of illumination and other ambient factors.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 2:
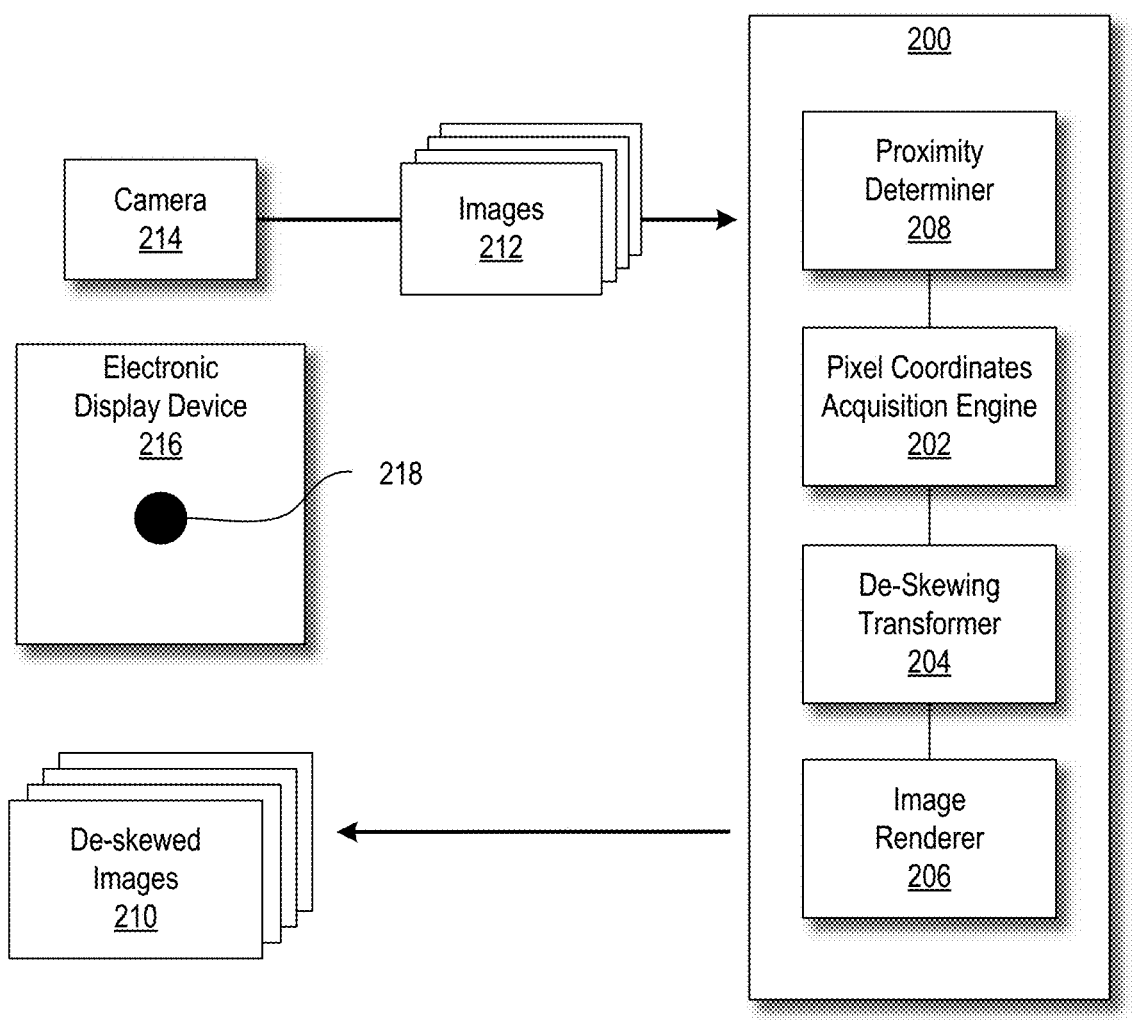
FIG. 2 illustrates an example image de-skewing system.
Figure 8:
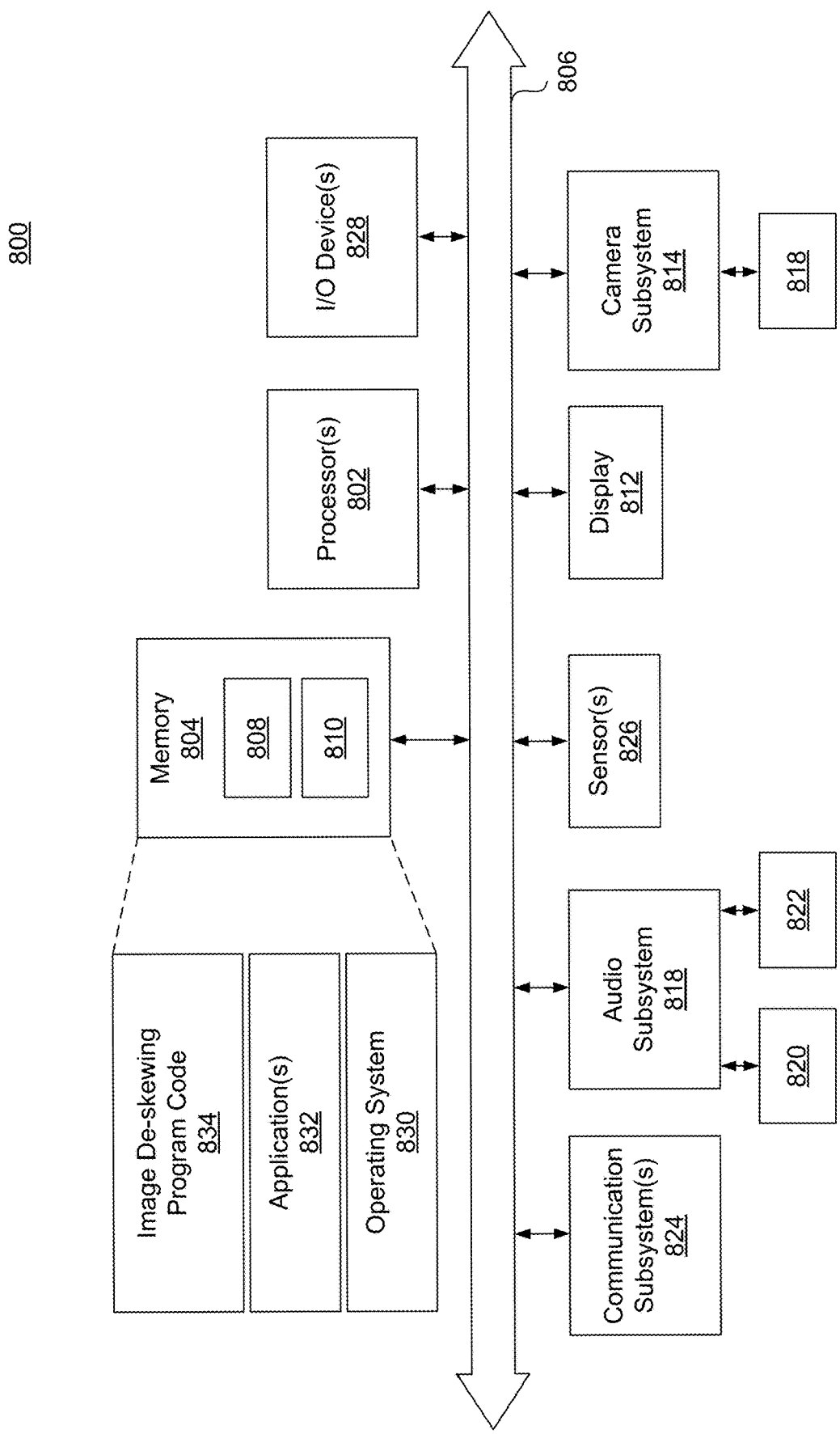
FIG. 8 illustrates an example device for implementing the system of FIG. 2.

FIG. 2 illustrates example image de-skewing system (system) 200. System 200 illustratively includes pixel coordinates acquisition engine 202, de-skewing transformer 204, image renderer 206, and optionally, proximity determiner 208. In various embodiments, pixel coordinates acquisition engine 202, de-skewing transformer 204, image renderer 206, and optionally, proximity determiner 208 of system 200 can each be implemented in hardware (e.g., dedicated hardwired circuitry), software (e.g., program code executed by one or more processors), or a combination thereof. For example, system 200 in certain embodiments is implemented in a device, such as device 800, in which system 200 comprises program code that is electronically stored in a memory, such as memory 804, and executes on one or more processors, such as processor(s) 802 (FIG. 8).

Operatively, system 200 is capable of generating de-skewed images 210 by processing images 212 received from camera 214, which communicatively couples with system 200. Camera 214 can be positioned adjacent to electronic display device 216. Electronic display device 216 can be a computer monitor, television screen, or other such display device that is coupled with or integrated in the device in which system 200 is implemented, such as display device 812 (FIG. 8).

Pixel coordinates acquisition engine 202 is capable of acquiring the coordinates of the pixels of images 212. The pixel coordinates can be acquired by pixel coordinates acquisition engine 202 as images 212 are captured by camera 214.

De-skewing transformer 204 is capable mapping the pixel coordinates of images 212 to de-skewing coordinates. In certain embodiments, de-skewing transformer 204 is configured to map pixel coordinates of images to de-skewing coordinates by applying a perspective transform. The de-skewing coordinates to which the pixel coordinates of images 212 are mapped are aligned with a principal axis, such as principal axis 108 (FIGS. 1A-1C). The perspective transform is an invertible mapping between two planar projections of an image, the mapping based on a non-singular 3×3 matrix, H, in a homogeneous coordinates space.

Image renderer 206 generates de-skewed images 210 by rendering each pixel of images 212 according to a corresponding de-skewing coordinate to align with the principal axis (FIGS. 1A-1C). Each of de-skewed images 210 is de-skewed and is coextensive with a viewing plane perpendicular to a principal axis, such as viewing plane 110 that is perpendicular to principal axis 106 (FIGS. 1A-1C). Accordingly, de-skewed images 210 are spatially oriented perpendicular to the principal axis.

The acquiring of the pixel coordinates, the mapping of the pixel coordinates by applying the perspective transform to de-skewing coordinates, and the generating de-skewed images based on the de-skewing coordinates can be performed by system 200 in real time with respect to a plurality of images (video data) captured by camera 214. The de-skewed images can be displayed on electronic display device 216 and/or conveyed via a wired or wireless connection to other electronic devices connected to the Internet, a wide-area network (WAN), a local-area network (LAN), or other communication network. Thus, system 200 can be used, for example, in the context of video conferencing. The de-skewing performed by system 200 perspective warps image frames captured by camera 214 so that de-skewed images 210 appear as though the images were captured by a camera with the lens substantially centered at 218, relative to electronic display device 216, rather than by the off-axis, display-mounted camera, camera 214.

Figure 3A:
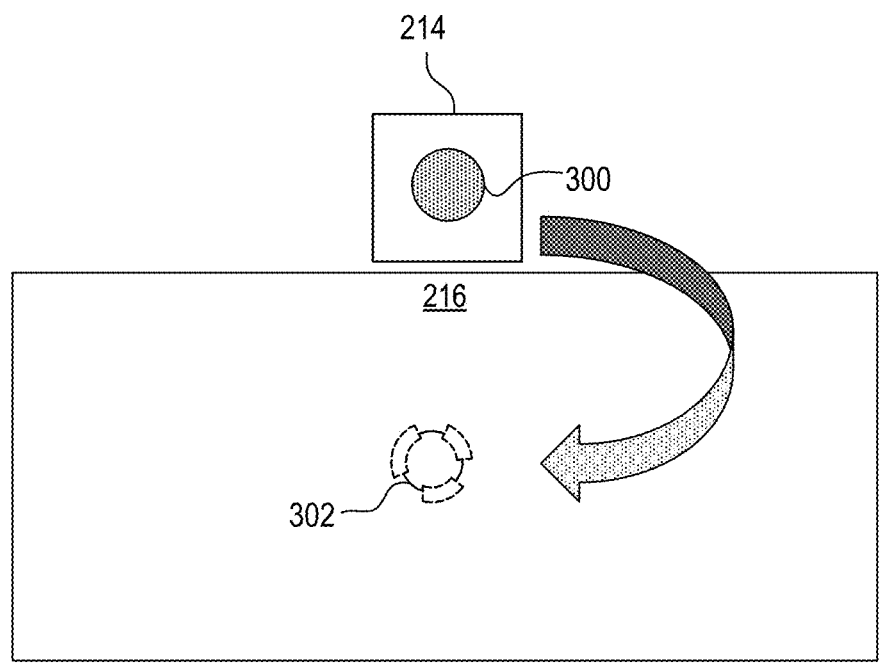
FIGS. 3A-3C illustrate certain aspects of the image de-skewing that is performed by the system of FIG. 2.
Figure 3B:
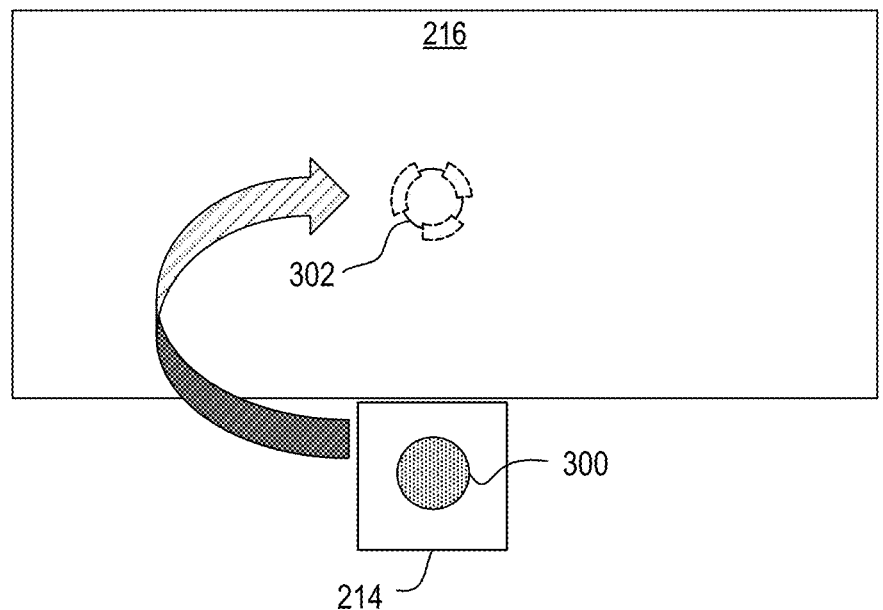
Figure 3C:
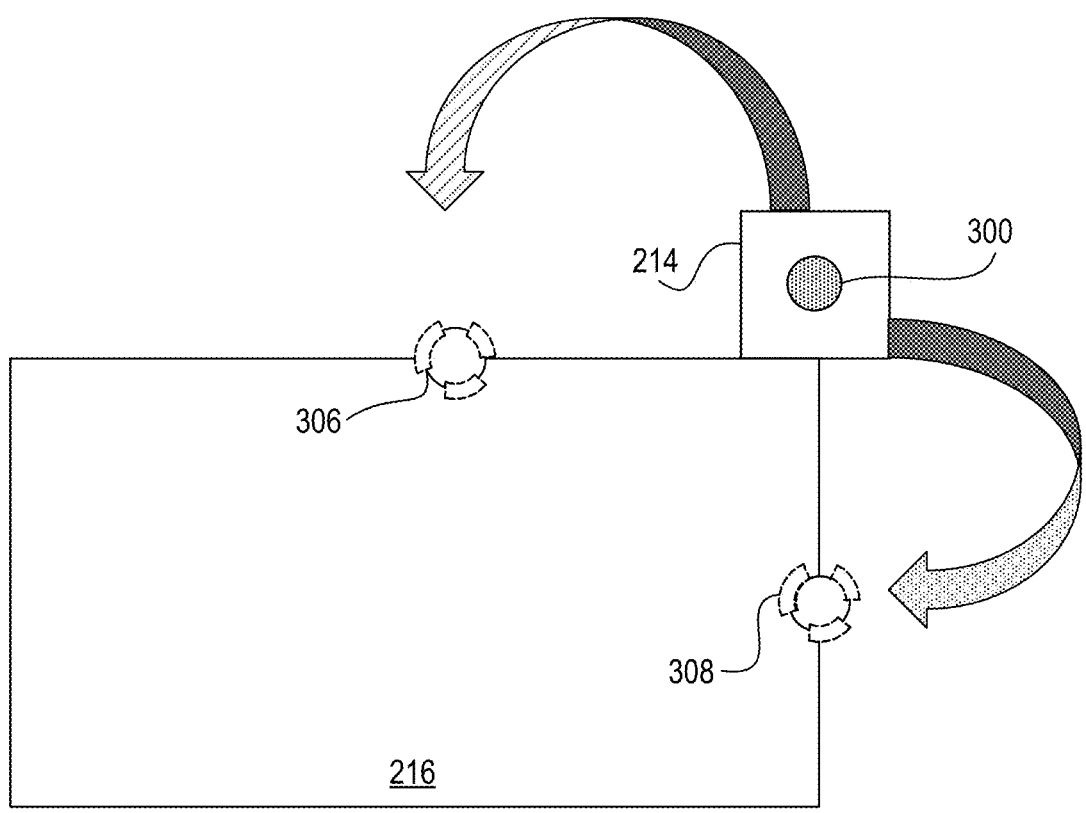

Referring additionally to FIGS. 3A-3C, the non-singular 3×3 matrix, H, perspective warps the pixel coordinates of images generated by camera 214. In FIG. 3A, camera 214, with lens 300, is illustratively positioned on the top edge of electronic display device 216. The perspective warping is performed by the non-singular 3×3 matrix, H, which maps image coordinates to de-skewing coordinates such that de-skewed images appear as though generated by a camera—an apparent or a virtual camera—with the lens at location 302, which illustratively is substantially centered relative to electronic display device 216. In FIG. 3B, camera 214, with lens 300, is illustratively positioned along the bottom edge of electronic display device 216. Non-singular 3×3 matrix, H, is configured to map image coordinates to de-skewing coordinates so that de-skewed images appear as though generated by a camera—the apparent or a virtual camera—with the lens at location 302, substantially at the center of electronic display device 216. In FIG. 3C, camera 214, with lens 300, is positioned in the northeast corner of electronic display device 216. Non-singular 3×3 matrix, H, can be configured to map image coordinates to de-skewing coordinates such that de-skewed images appear to be captured by a camera centered along either the top edge or along the east edge, at position 306 or 308 depending on the particular configuration of non-singular 3×3 matrix, H.

In FIGS. 3A-3C, the coordinates of images captured by camera 214 are mapped to de-skewing coordinates. De-skewed images are generated based on the de-skewed coordinates. The de-skewed images correspond to a viewing plane perpendicular to the principal axis. In FIG. 3A, the principal axis extends outward from the plane of display device 216 from location 302, which corresponds to the position of a virtual or an apparent camera. The de-skewed image is thus coextensive with the viewing plane perpendicular to the principal axis. In FIG. 3B, the principal axis extends outwardly from location 302, the position of the virtual or apparent camera, and is perpendicular to the plane of display device 216. In FIG. 3C, the principal axis perpendicular to the plane of display device 216 extends outward from either location 306 or location 308, alternative locations of an apparent or a virtual camera. Thus, as a result of the perspective warping, each de-skewed image is spatially oriented perpendicular to the principal axis such that each de-skewed image is coextensive with a viewing plane perpendicular to the principal axis.

Figure 4A:
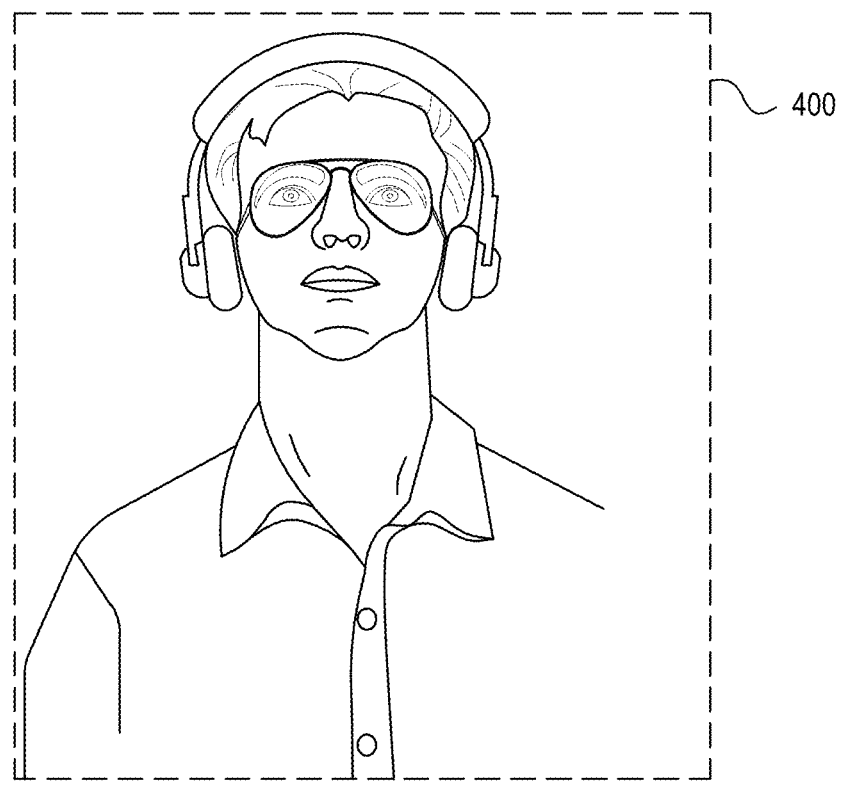
FIGS. 4A-4C illustrate certain other aspects of the system of FIG. 2, including de-skewing far-field images and refraining from de-skewing near-field images.
Figure 4A:
Figure 4B:
Figure 4B:

In FIG. 4A, image 400 illustrates a viewing perspective in which image 400 is captured by an off-axis camera positioned at the bottom edge of electronic display device in front of an individual whose features appear as in image 400. As illustrated, the viewing perspective for image 400 is upward looking rather than forward looking. Using non-singular 3×3 matrix, H, de-skewing transformer 204 perspective warps image 400 into image 402 such that the individual is shown from a forward-looking perspective. In FIG. 4B, image 404 illustrates the viewing perspective in which image 404 is captured by an off-axis camera positioned at the top edge of electronic display device, such that the viewing perspective is downward looking rather than forward looking. De-skewing transformer, using non-singular 3×3 matrix, H, perspective warps image 404 to generate forward-looking de-skewed image 406.

Figure 4C:
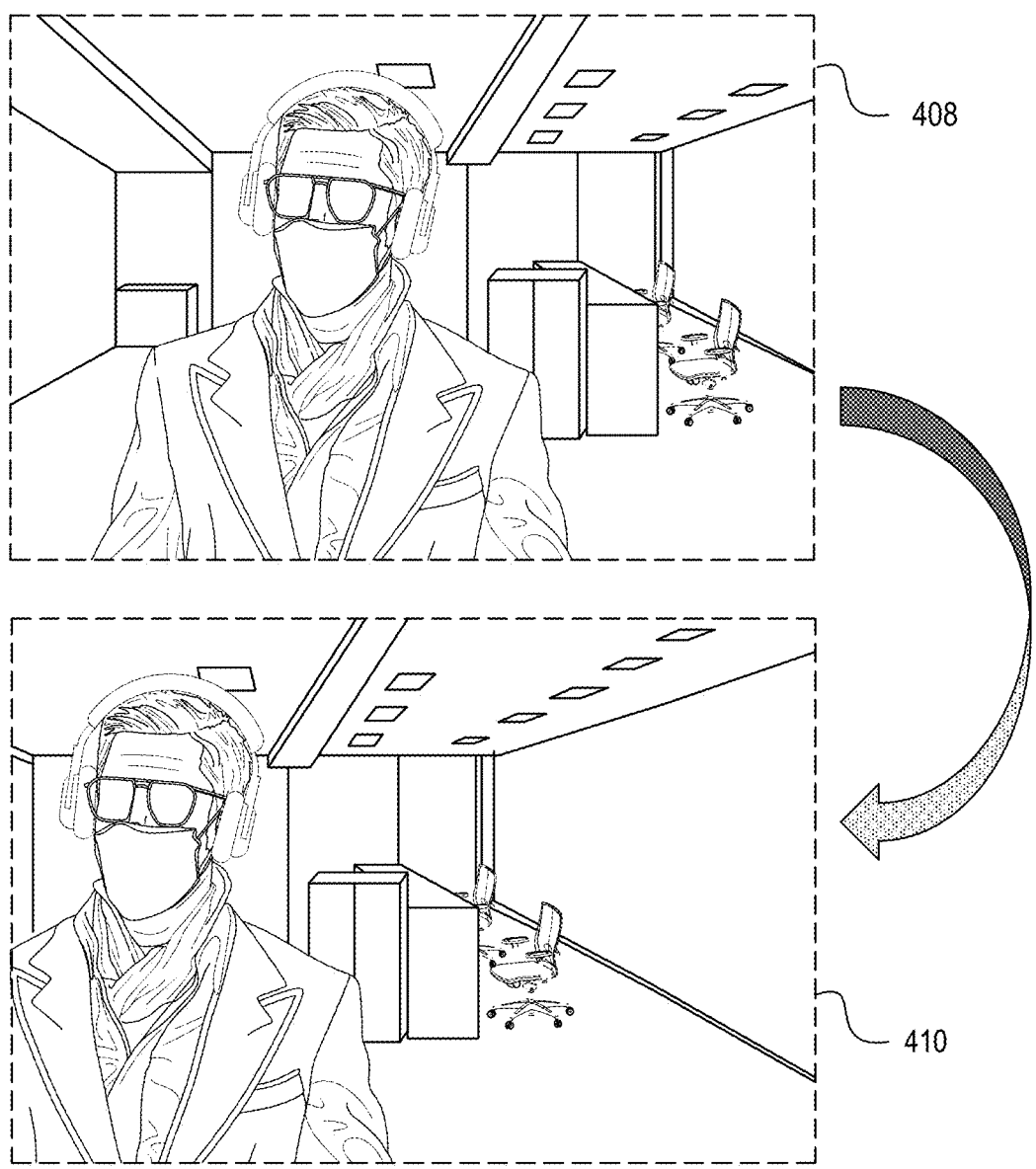

As FIG. 4C illustrates, however, there are instances in which it may be disadvantageous to de-skew images. Image 408 is an image rendered without de-skewing. Image 410 is a perspective warped image. As illustrated, the perspective warping results in a distorted image because the object (an individual) is too near the camera. In the context of video conferencing, for example, if a participant moves sufficiently close to electronic display device 216, a de-skewed image of the participant is undesirable.

Accordingly, in certain embodiments, for a plurality of sequential images, system 200 automatically switches between de-skewed images 210 and the unmodified rendering of images 212. The switching is based on a predetermined distance between the camera and an identified object appearing within the image. Optionally, system 200 includes proximity determiner 208. Proximity determiner 208 determines a distance between an object in a plurality of sequential images and camera 214. If the object is less than a predetermined threshold, system 200 initiates an automatic frame switching so that the de-skewing operations cease.

In certain embodiments (especially applicable, for example, in the context of video conferencing), proximity determiner 208 determines a distance between a user and camera 214 by detecting one or more landmarks and computes the distance based on the landmarks. For example, in some embodiments, proximity determiner 208 determines a distance between camera 214 and the user by tracking—in real time, using camera 214—the iris, pupil, and eye contours of the user. Proximity determiner 208 implements a machine learning model that is trained to estimate eye contour and iris location based on key points in a mesh of the user's facial geometry generated from an image of the user. Based on the key points in the image of the user's eye, proximity determiner 208 determines the distance between the user and camera 214. The machine learning model once trained can estimate the distance between camera 214 and the user.

As described above, when images 212 are de-skewed, de-skewing transformer 204 can perform a perspective transform that maps pixel coordinates to de-skewed coordinates, the mapping based on a non-singular 3×3 matrix, H, in a homogeneous coordinate space. The elements $h_{ij}$, $i,j \in \{0, 1, 2\}$, of non-singular 3×3 matrix, H, are predetermined. For example, the matrix elements can be determined in conjunction with the fabrication of electronic display device 216 and mounting of camera 214 to the electronic display device 216. Whether performed in conjunction with fabrication and mounting or subsequent thereto, the elements of non-singular 3×3 matrix, H, are determined based on N images of a calibration pattern captured with a calibration rig. The rig comprises camera 214, mounted to electronic display device 216, as well as a second camera positioned relative to electronic display device 216 to capture the perspective of de-skewed images. Relevant key points or landmarks of the calibration pattern are determined for each of the N images. Pixel coordinates corresponding to the landmarks in the N images that are captured by mounted camera 214 are, for the i-th landmark of the k-th image, denoted $(u_i, v_i)_0^k$. Pixel coordinates corresponding to the landmarks in the N images that are captured by the center camera are denoted $(u_i, v_i)_1^k$. The landmarks of a calibration pattern determine the relative positions between camera 214, which is mounted on an edge of electronic display device 216, and a virtual camera positioned relative to electronic display device 216 at a location to capture the perspective of the apparent or virtual camera.

Given the correspondence of landmark pixel coordinates $(u_i, v_i)$ in N images across both cameras, the elements of non-singular 3×3 matrix, H, can be determined such that the matrix maps landmarks from mounted camera 214 to the perspective of the apparent or virtual camera. Based on the relationship $$(u_i, v_i, 1)_0^k = H(u_i, v_i, 1)_1^k$$

H is determined by solving the resulting system of linear equations. H is a null space solution of the system of linear equations.

An advantage of the perspective transform performed by de-skewing transformer 204 is that once the non-singular 3×3 matrix, H, is obtained—which as described below can be predetermined—any pixel from one projective plane can be mapped to any corresponding one in a second projective plane.

In certain embodiments, the user can calibrate system 200, assuming camera 214 is calibrated and that the user is provided a corresponding camera matrix, K, and distortion coefficients. The user acquires an image of a calibration target and one or more landmark positions of the calibration target. For example, the user can acquire an image of a pre-constructed calibration pattern (e.g., a chessboard) or, for example, an image of the user's own face to determine a pose of the camera viewing direction. Based on the one or more landmark positions and one or more pre-stored landmark positions (e.g., stored at the point of fabrication), calibrates de-skewing transformer 204.

De-skewing transformer 204 can be calibrated by determining the non-singular 3×3 matrix, $H = KGK^{-1}$, where K is the corresponding camera matrix. The matrix G is computed as $$R_1^2 + \frac{t_1^2 \cdot n^T}{d},$$

where $R_1^2$ is the rotation matrix corresponding to a relative rotation between the mounted camera 214 and the virtual camera, $t_1^2$ is the relative translation vector, $n^T$ is the transpose of the normal vector perpendicular to the user's viewing plane, and d is the relative camera displacement with respect to the user's viewing plane. For the virtual camera, R/t can be precomputed and stored (e.g., in a memory of electronic display device 216 itself since it serves as the origin), whereas R/t of camera 214 can be computed based on the image of the calibration pattern (e.g., chessboard, user's facial features). All of the values can be determined from the calibration target, which can be captured in a single image for purposes of calibration.

The non-singular 3×3 matrix, H, is a homography matrix that operates on 2D image pixels. In other embodiments, de-skewing transformer can comprise an SE(3) pose matrix that operates on pixels of images that correspond to 3D estimates generated by a 3D estimator operatively coupled to de-skewing transformer 204. In some embodiments, the 3D estimator comprises a neural network. The neural network, in certain embodiments, can produce monocular depth from a single RGB image. In other embodiments, a combination of RGB and depth sensor input to the neural network can output a depth, and from the depth and 2D image, can generate a 3D point cloud. In still other embodiments, the 3D estimator can comprise a depth sensor, multiple stereo cameras, or a coded aperture camera. De-skewing transformer 204 maps coordinates of the 3D estimates to de-skewing coordinates using the SE(3) pose matrix. Image renderer 206 can comprise a conventional renderer or a neural renderer for generating de-skewed images based on the de-skewing coordinates.

Figure 5:
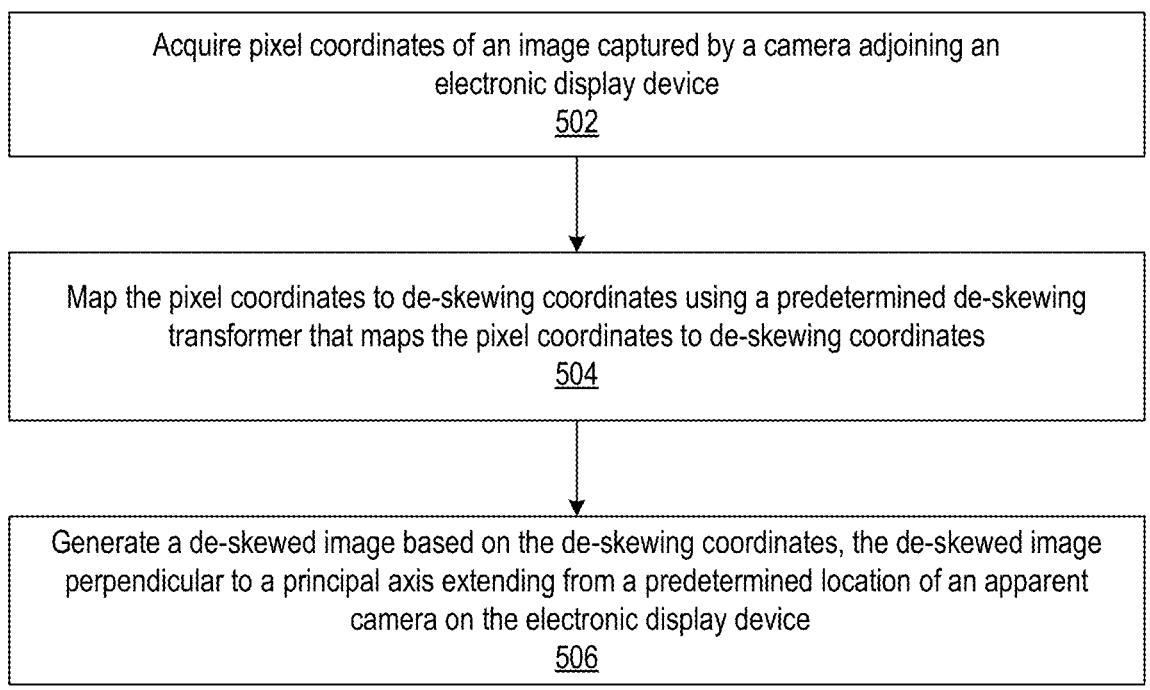
FIG. 5 illustrates an example method of de-skewing images.

FIG. 5 illustrates example method 500 of image de-skewing. Method 500 can be performed by a system the same as or similar to system 200. At block 502, the system acquires the pixel coordinates of an image captured by a camera adjoining an electronic display device. The camera adjoining the electronic display device can be operatively coupled to the system.

At block 504, the system maps the pixel coordinates to de-skewing coordinates. The mapping can be done using a predetermined de-skewing transformer. The de-skewing transformer in certain embodiments performs a perspective transform using a predetermined homography matrix. In other embodiments, the de-skewing transformer implements an SE(3) pose matrix for mapping coordinates of 3D estimates of a 3D image estimator. The 3D estimator can comprise a neural network, depth sensor, coded aperture camera, or stereo cameras.

At block 506, the system generates a de-skewed image. The de-skewed image is generated based on the de-skewed coordinates. The de-skewed image is spatially oriented perpendicular to a principal axis, the principal axis extending from a predetermined location of a virtual or an apparent camera on the electronic display device. The location of the virtual or apparent camera, in various arrangements, can be centered on the electronic display device. In various other arrangements, the virtual or apparent camera can be at different locations, such as centered along a border of the electronic display device if a display-mounted camera is positioned at a corner of the electronic display device. The system can perform the acquiring, mapping, and generating in real time to process a plurality of images of video data captured by the camera. The de-skewed images that are thus generated can be sent to other devices.

Figure 6:
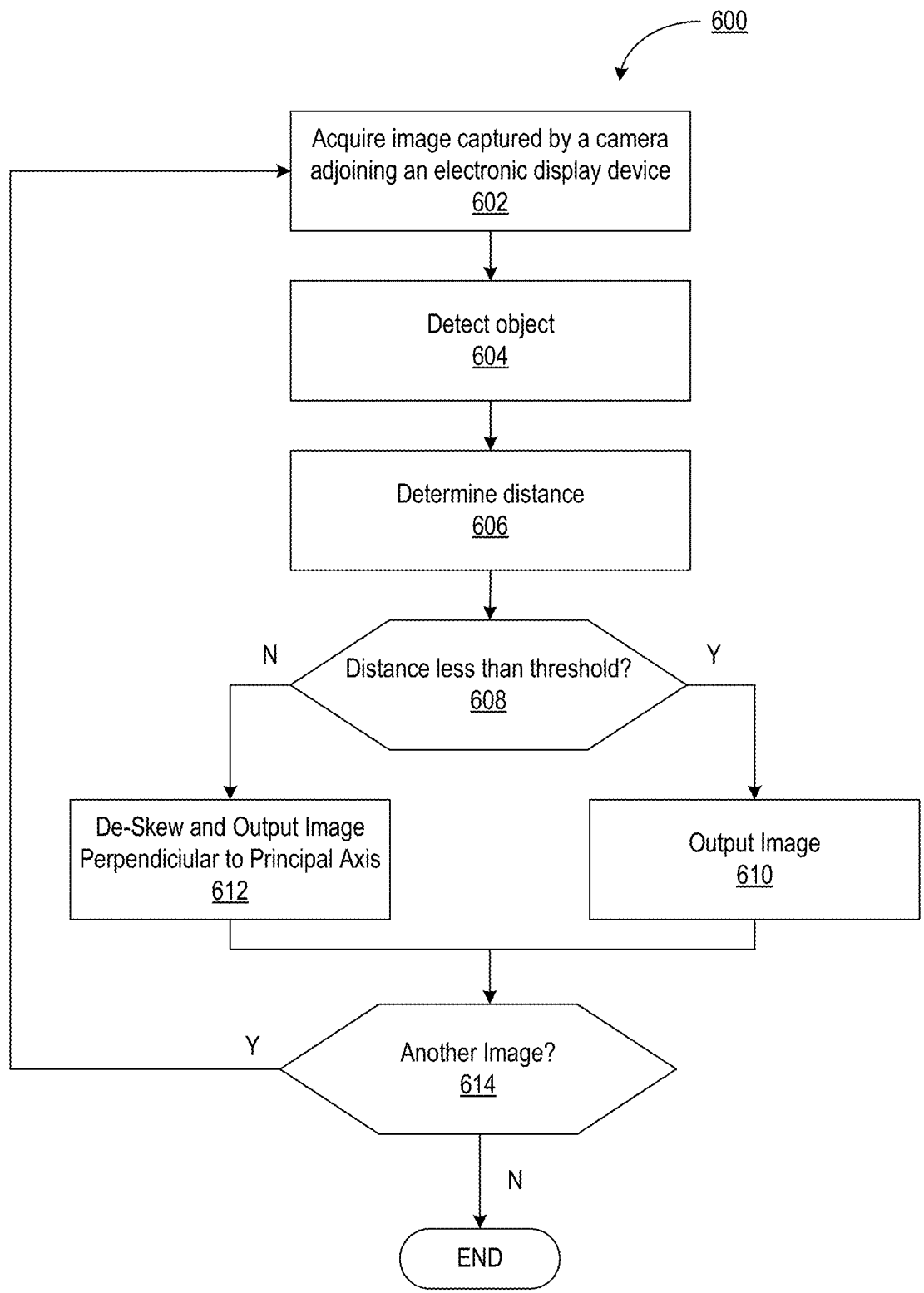
FIG. 6 illustrates an example method of switching between image de-skewing and rendering unmodified images during processing of multiple images.

FIG. 6 illustrates example method 600 for switching between image de-skewing and rendering unmodified images during processing of multiple images. Method 600 can be performed by a system the same as or similar to system 200.

At block 602, the system acquires an image captured by a camera adjoining an electronic display device. The camera adjoining the electronic display device can be operatively coupled with the system. The system at block 604 can detect objects appearing within the image. The objects can be predetermined landmarks, such as facial landmarks of a user.

At block 606, the system determines the distance between a detected object (e.g., user's facial landmark) and the camera. In certain embodiments, the system determines the distance using a machine learning model trained to determine the distance based on eye contour and iris location in a camera-captured image of the user. If, at block 608, the system determines that the distance is less than a predetermined threshold, then the system outputs the image unmodified at block 610. At block 608, if the system determines the distance is greater than or equal to the predetermined threshold, the system at block 612 invokes the above-detailed processes of de-skewing the pixel coordinates of the image and outputs a version of the image that is perpendicular to a principal axis extending from a location of an apparent or a virtual camera. At block 614, system determines whether one or more images are to be processed, and if so, resumes processing at block 602. The image processing can be performed with sufficient speed such that video may be processed in real time, and the images (both unmodified and de-skewed images) can be conveyed to other devices.

Figure 7:
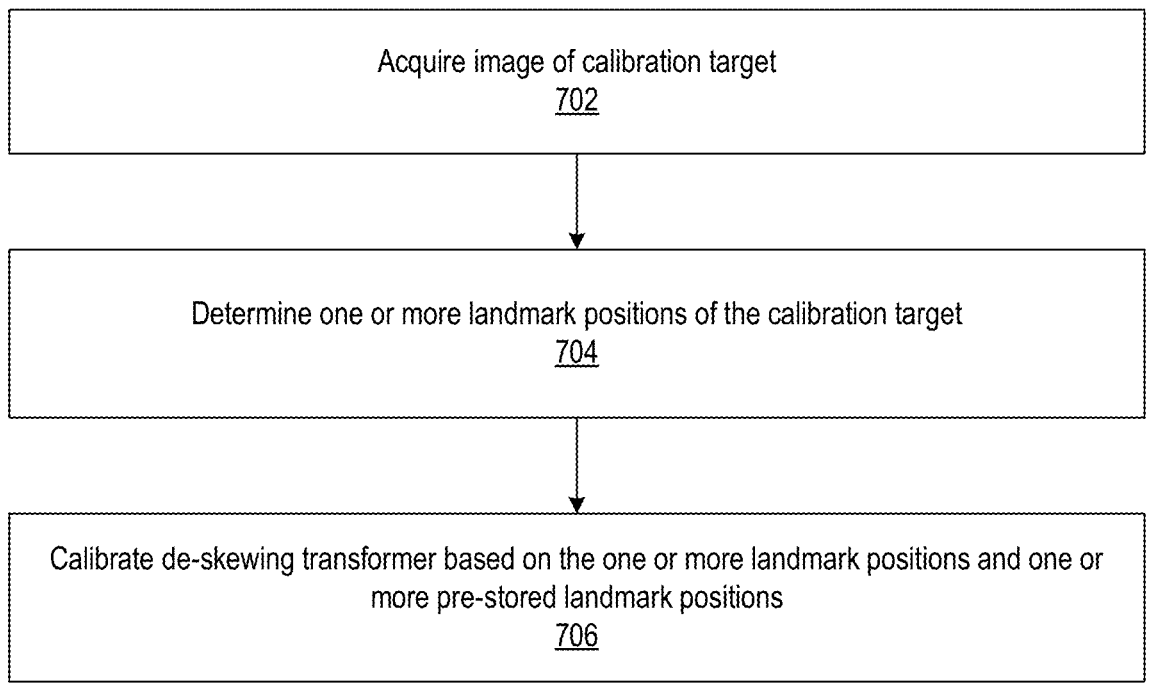
FIG. 7 illustrates an example method of calibrating a de-skewing transformer of an image de-skewing system.

FIG. 7 illustrates example method 700 of calibrating a de-skewing transformer of an image de-skewing system. Method 700 can be performed by a system the same as or similar to system 200.

At block 702, the system acquires an image of a calibration target. The image of the calibration target can be acquired with a camera operatively coupled with the system. The calibration target, in certain arrangements, can be a patterned sheet (e.g., a chessboard-like sheet) provided to the user, for example, in a manual or from a website created by the fabricator of the electronic display device in which the camera is embedded or to which the camera is mounted. The system can acquire the image of the calibration target by the user holding it in front of the camera. In still other arrangements, the calibration target can be a scene containing one or more landmarks, such as facial features of the user, for example.

At block 704, the system determines one or more landmark positions of the calibration target. The one or more landmark positions are compared with predetermined landmarks. The predetermined landmarks can be pre-stored from an earlier calibration (e.g., performed by the camera fabricator). At block 706, the system calibrates the de-skewing transformer based on the comparison one or more landmark positions and one or more pre-stored landmark positions.

In certain embodiments, the calibration is based on the solution of a system of linear equations. The system of linear equations corresponds to $H = KGK^{-1}$, where K is the camera matrix and matrix G is computed as $$R_1^2 + \frac{t_1^2 n^T}{d}.$$

$R_1^2$ is the rotation matrix corresponding to a relative rotation between the camera and a virtual camera positioned relative to the electronic display device to which the camera is mounted or in which the camera is embedded. The $t_1^2$ is the relative translation vector. The $n^T$ is the transpose of the normal vector perpendicular to the user's viewing plane. The second term of G is the product of the relative translation vector and vector normal to the viewing plane. The d is the relative camera displacement with respect to the user's viewing plane. For the virtual camera positioned relative to the electronic display device, R/t can be precomputed and stored in the electronic display device itself. The R/t of the mounted camera can be computed based on the image of the calibration pattern (e.g., printed pattern, user's facial features). Each of the values can be determined from the image of the calibration target.

FIG. 8 illustrates an example device 800 in which system 200 can be implemented. Device 800 includes one or more processors 802 coupled to memory 804 through interface circuitry 806. Device 800 stores computer readable instructions (also referred to as "program code") within memory 804, which is an example of computer readable storage media. Processor(s) 802 execute the program code accessed from memory 804 via interface circuitry 806.

Memory 804 can include one or more physical memory devices such as local memory 808 and bulk storage device 810, for example. Local memory 808 is implemented as one or more non-persistent memory device(s) generally used during actual execution of the program code. Local memory 808 is an example of a runtime memory. Examples of local memory 808 include any of the various types of RAM suitable for use by a processor for executing program code. Bulk storage device 810 is implemented as a persistent data storage device. Examples of bulk storage device 810 include a hard disk drive (HDD), a solid-state drive (SSD), flash memory, a read-only memory (ROM), an erasable programmable read-only memory (EPROM), electrically erasable programmable read-only memory (EEPROM), or other suitable memory. Device 800 can also include one or more cache memories (not shown) that provide temporary storage of at least some program code in order to reduce the number of times program code must be retrieved from a bulk storage device during execution.

Examples of interface circuitry 806 include, but are not limited to, an input/output (I/O) subsystem, an I/O interface, a bus system, and a memory interface. For example, interface circuitry 806 can be implemented as any of a variety of bus structures and/or combinations of bus structures including a memory bus or memory controller, a peripheral bus, an accelerated graphics port, and a processor or local bus.

In one or more example implementations, processor(s) 802, memory 804, and/or interface circuitry 806 are implemented as separate components. Processor(s) 802, memory 804, and/or interface circuitry 806 may be integrated in one or more integrated circuits. The various components in device 800, for example, can be coupled by one or more communication buses or signal lines (e.g., interconnects and/or wires). Memory 804 may be coupled to interface circuitry 806 via a memory interface, such as a memory controller or other memory interface (not shown).

Device 800 can include one or more displays. Illustratively, for example, device 800 includes display 812 (e.g., a screen). Display 812 can be implemented as a touch-sensitive or touchscreen display capable of receiving touch input from a user. A touch sensitive display and/or a touch-sensitive pad is capable of detecting contact, movement, gestures, and breaks in contact using any of a variety of avail, able touch sensitivity technologies. Example touch sensitive technologies include, but are not limited to, capacitive, resistive, infrared, and surface acoustic wave technologies, and other proximity sensor arrays or other elements for determining one or more points of contact with a touch sensitive display and/or device.

Device 800 can include camera subsystem 814. Camera subsystem 814 can be coupled to interface circuitry 806 directly or through a suitable input/output (I/O) controller. Camera subsystem 814 can be coupled to optical sensor 816. Optical sensor 816 can be implemented using any of a variety of technologies. Examples of optical sensor 816 can include, but are not limited to, a charged coupled device (CCD) or a complementary metal-oxide semiconductor (CMOS) optical sensor. Optical sensor 816, for example, can be a depth sensor. Camera subsystem 814 and optical sensor 816 are capable of performing camera functions such as recording or capturing images and/or recording video.

Device 800 can include an audio subsystem 818. Audio subsystem 818 can be coupled to interface circuitry 806 directly or through a suitable input/output (I/O) controller. Audio subsystem 818 can be coupled to a speaker 820 and a microphone 822 to facilitate voice-enabled functions, such as voice recognition, voice replication, digital recording, and telephony functions.

Device 800 can include one or more communication subsystems 824, each of which can be coupled to interface circuitry 806 directly or through a suitable I/O controller (not shown). Each of communication subsystem(s) 824 is capable of facilitating communication functions. For example, communication subsystems 824 can include one or more wireless communication subsystems such as, but are not limited to, radio frequency receivers and transmitters, and optical (e.g., infrared) receivers and transmitters. The specific design and implementation of communication subsystem 824 can depend on the particular type of device 800 implemented and/or the communication network(s) over which device 800 is intended to operate.

As an illustrative and non-limiting example of a wireless communication system, communication subsystem(s) 824 can be designed to operate over one or more mobile networks, WiFi networks, short range wireless networks (e.g., a Bluetooth), and/or any combination of the foregoing. Communication subsystem(s) 824 can implement hosting protocols such that device 800 can be configured as a base station for other devices.

Device 800 may include one or more sensors 826, each of which can be coupled to interface circuitry 806 directly or through a suitable I/O controller (not shown). Examples of sensor(s) 826 that can be included in device 800 include, but are not limited to, a motion sensor, a light sensor, and a proximity sensor to facilitate orientation, lighting, and proximity functions, respectively, of device 800. Other examples of sensors 826 can include, but are not limited to, a location sensor (e.g., a GPS receiver and/or processor) capable of providing geo-positioning sensor data, an electronic magnetometer (e.g., an integrated circuit chip) capable of providing sensor data that can be used to determine the direction of magnetic North for purposes of directional navigation, an accelerometer capable of providing data indicating change of speed and direction of movement of device 800 in 3D, and an altimeter (e.g., an integrated circuit) capable of providing data indicating altitude.

Device 800 further may include one or more input/output (I/O) devices 828 coupled to interface circuitry 806. I/O device(s) 828 can be coupled to interface circuitry 806 either directly or through intervening I/O controllers (not shown). Examples of I/O devices 828 include, but are not limited to, a track pad, a keyboard, a display device, a pointing device, one or more communication ports (e.g., Universal Serial Bus (USB) ports), a network adapter, and buttons or other physical controls. A network adapter refers to circuitry that enables device 800 to become coupled to other systems, computer systems, remote printers, and/or remote storage devices through intervening private or public networks. Modems, cable modems, Ethernet interfaces, and wireless transceivers not part of wireless communication subsystem (s) 824 are examples of different types of network adapters that may be used with device 800. One or more of I/O devices 828 may be adapted to control functions of one or more or all of sensors 826 and/or one or more of wireless communication subsystem(s) 824.

Memory 804 stores program code. Examples of program code include, but are not limited to, routines, programs, objects, components, logic, and other data structures. For purposes of illustration, memory 804 stores an operating system 830 and application(s) 832. In addition, memory 804 can store image de-skewing program code 834 for implementing a system, such as system 200.

Device 800 is provided for purposes of illustration and not limitation. A device and/or system configured to perform the operations described herein can have a different architecture than illustrated in FIG. 8. The architecture can be a simplified version of the architecture described in connection with FIG. 8 that includes a memory capable of storing instructions and a processor capable of executing instructions. In this regard, device 800 may include fewer components than shown or additional components not illustrated in FIG. 8 depending upon the particular type of device that is implemented. In addition, the particular operating system and/or application(s) included can vary according to device type as can the types of I/O devices included. Further, one or more of the illustrative components can be incorporated into, or otherwise form a portion of, another component. For example, a processor may include at least some memory.

Device 800 can be implemented as a data processing system, a communication device, or other suitable system that is suitable for storing and/or executing program code. Device 800 can be implemented as an edge device. Example implementations of device 800 can include, but are not to limited to, computing devices. Computing devices include, for example, a computer (e.g., desktop, laptop, tablet computer), a television, an entertainment console, an XR system, or other appliance capable of cooperatively operating as a display device (e.g., HMD, AR glasses) or a source device (e.g., smartphone, console, computer) operating in conjunction with an electronic display device, as described herein.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "real-time" means a level of processing responsiveness that a user or system senses as sufficiently immediate for a particular process or determination to be made, or that enables the processor to keep up with some external process.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms "user" and "participant" refer to a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-implemented method, comprising:
   acquiring pixel coordinates of pixels of an image captured by a camera adjoining an electronic display device;
   wherein the camera has an off-axis position from a principal axis extending from a predetermined location of an apparent camera on the electronic display device;
   mapping, by a predetermined de-skewing transformer, the pixel coordinates to de-skewing coordinates aligned with the principal axis;
   correcting for the off-axis position of the camera by generating a de-skewed image based on the de-skewing coordinates, wherein the de-skewed image is perpendicular to the principal axis; and
   for one or more selected images of a plurality of sequential images, switching between a de-skewed rendering of the one or more selected images in response to a distance between the camera and an identified object appearing in the one or more selected images being greater than or equal to a predetermined distance and an unmodified rendering of the one or more selected images in response to the distance being less than the predetermined distance.

2. The computer-implemented method of claim 1, comprising:
   acquiring an image of a calibration target;
   determining one or more landmark positions of the calibration target; and
   calibrating the predetermined de-skewing transformer based on the one or more landmark positions and one or more pre-stored landmark positions.

3. The computer-implemented method of claim 2, wherein
   the calibrating comprises generating a correction matrix based on a predetermined camera matrix for the camera, an inverse of the predetermined camera matrix, a matrix determined based on relative rotation and relative translation between the camera and a second camera, and relative displacement between the camera and a viewing plane corresponding to the calibration target.

4. The computer-implemented method of claim 1, wherein
   the pixels of the image correspond to a 3D estimate generated by a 3D estimator of the image; and
   the predetermined de-skewing transformer comprises an SE (3) pose matrix.

5. The computer-implemented method of claim 4, wherein
   the 3D estimator comprises a neural network.

6. The computer-implemented method of claim 4, wherein
   the 3D estimator comprises a depth sensor.

7. The computer-implemented method of claim 4, wherein
   the 3D estimator comprises at least one of a coded aperture camera or multiple stereo cameras.

8. The computer-implemented method of claim 1, wherein
the acquiring, the mapping, and the generating are performed in real time to process a plurality of images of video data captured by the camera.

9. The computer-implemented method of claim 1, comprising:
sending the de-skewed image to a device.

10. A system, comprising:
a processor configured to initiate operations including:
acquiring pixel coordinates of pixels of an image captured by a camera adjoining an electronic display device;
wherein the camera has an off-axis position from a principal axis extending from a predetermined location of an apparent camera on the electronic display device;
mapping, by a predetermined de-skewing transformer, the pixel coordinates to de-skewing coordinates aligned with the principal axis;
correcting for the off-axis position of the camera by generating a de-skewed image based on the de-skewing coordinates, wherein the de-skewed image is perpendicular to the principal axis;
for one or more selected images of a plurality of sequential images, switching between a de-skewed rendering of the one or more selected images in response to a distance between the camera and an identified object appearing in the one or more selected images being greater than or equal to a predetermined distance and an unmodified rendering of the one or more selected images in response to the distance being less than the predetermined distance.

11. The system of claim 10, wherein the processor is configured to initiate operations further including:
acquiring an image of a calibration target;
determining one or more landmark positions of the calibration target; and
calibrating the predetermined de-skewing transformer based on the one or more landmark positions and one or more pre-stored landmark positions.

12. The system of claim 11, wherein
the calibrating comprises generating a correction matrix based on a predetermined camera matrix for the camera, an inverse of the predetermined camera matrix, a matrix determined based on relative rotation and relative translation between the camera and a second camera, and relative displacement between the camera and a viewing plane corresponding to the calibration target.

13. The system of claim 10, wherein
the pixels of the image correspond to a 3D estimate generated by a 3D estimator of the image; and
the predetermined de-skewing transformer comprises an SE (3) pose matrix.

14. The system of claim 13, wherein
the 3D estimator comprises a neural network.

15. The system of claim 13, wherein
the 3D estimator comprises at least one of a depth sensor, a coded aperture camera, or multiple stereo cameras.

16. The system of claim 10, wherein
the acquiring, the mapping, and the generating are performed in real time to process a plurality of images of video data captured by the camera.

17. The system of claim 16, wherein the processor is configured to initiate operations further including:
sending the de-skewed image to a device.

18. A computer program product, the computer program product comprising:
one or more computer-readable storage media and program instructions collectively stored on the one or more computer-readable storage media, the program instructions executable by a processor to cause the processor to initiate operations including:
acquiring pixel coordinates of an image captured by a camera adjoining an electronic display device;
wherein the camera has an off-axis position from a principal axis extending from a predetermined location of an apparent camera on the electronic display device;
mapping, by a predetermined de-skewing transformer, the pixel coordinates to de-skewing coordinates aligned with the principal axis;
correcting for the off-axis position of the camera by generating a de-skewed image based on the de-skewing coordinates, wherein the de-skewed image is perpendicular to the principal axis; and
for one or more selected images of a plurality of sequential images, switching between a de-skewed rendering of the one or more selected images in response to a distance between the camera and an identified object appearing in the one or more selected images being greater than or equal to a predetermined distance and an unmodified rendering of the one or more selected images in response to the distance being less than the predetermined distance.

* * * * *